(12) United States Patent  
Xia

(10) Patent No.: US 9,330,112 B2
(45) Date of Patent: May 3, 2016

(54) GROUPING AND COMPRESSING SIMILAR PHOTOS

(71) Applicant: Zhigang Xia, Shang hai (CN)

(72) Inventor: Zhigang Xia, Shang hai (CN)

(73) Assignee: Intel Corporation, Santa Clara, CA (US)

( * ) Notice: Subject to any disclaimer, the term of this patent is extended or adjusted under 35 U.S.C. 154(b) by 109 days.

(21) Appl. No.: 14/127,399

(22) PCT Filed: Sep. 16, 2013

(86) PCT No.: PCT/US2013/059866
§ 371 (c)(1),
(2) Date: Dec. 18, 2013

(87) PCT Pub. No.: WO2015/038154
PCT Pub. Date: Mar. 19, 2015

(65) Prior Publication Data
US 2015/0078673 A1    Mar. 19, 2015

(51) Int. Cl.
*G06F 17/30* (2006.01)
*H04N 19/124* (2014.01)
*H04N 19/136* (2014.01)
*H04N 19/105* (2014.01)
*H04N 19/503* (2014.01)
*H04N 19/162* (2014.01)
*H04N 19/177* (2014.01)

(52) U.S. Cl.
CPC .......... *G06F 17/3028* (2013.01); *H04N 19/105* (2014.11); *H04N 19/124* (2014.11); *H04N 19/136* (2014.11); *H04N 19/162* (2014.11); *H04N 19/177* (2014.11); *H04N 19/503* (2014.11)

(58) Field of Classification Search
CPC ............ G06F 17/3028; H04N 19/105; H04N 19/124; H04N 19/136
USPC .......................................... 382/232–233, 236
See application file for complete search history.

(56) References Cited

U.S. PATENT DOCUMENTS

| | | | |
|---|---|---|---|
| 7,116,714 B2 * | 10/2006 | Hannuksela | ............. 375/240.12 |
| 8,811,756 B2 * | 8/2014 | Rodriguez | ........... H04N 19/503 |
| | | | 382/232 |
| 2004/0205286 A1 | 10/2004 | Bryant et al. | |
| 2009/0109298 A1 * | 4/2009 | Wan | .......................... 348/222.1 |
| 2010/0278396 A1 | 11/2010 | Mitsuhashi et al. | |
| 2013/0058577 A1 | 3/2013 | Stubler et al. | |

FOREIGN PATENT DOCUMENTS

KR    10-2004-0049424 A    6/2004
KR    10-1191172 B1    10/2012

OTHER PUBLICATIONS

International Search Report and Written Opinion received for PCT Patent Application No. PCT/US2013/059866, mailed on May 27, 2014, 10 pages.

* cited by examiner

*Primary Examiner* — Kanjibhai Patel
(74) *Attorney, Agent, or Firm* — Jordan IP Law, LLC

(57) ABSTRACT

Systems and methods may provide for assigning a subset of a plurality of photos to a group and selecting a reference photo from the group. Additionally, the reference photo may be used to conduct a compression of one or more remaining photos assigned to the group. In one example, the reference photo and the compressed one or more remaining photos assigned to the group are transmitted to a remote server.

20 Claims, 5 Drawing Sheets

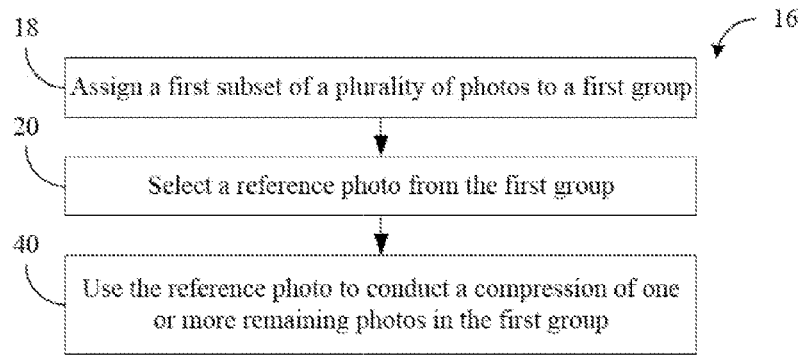
FIG. 2A
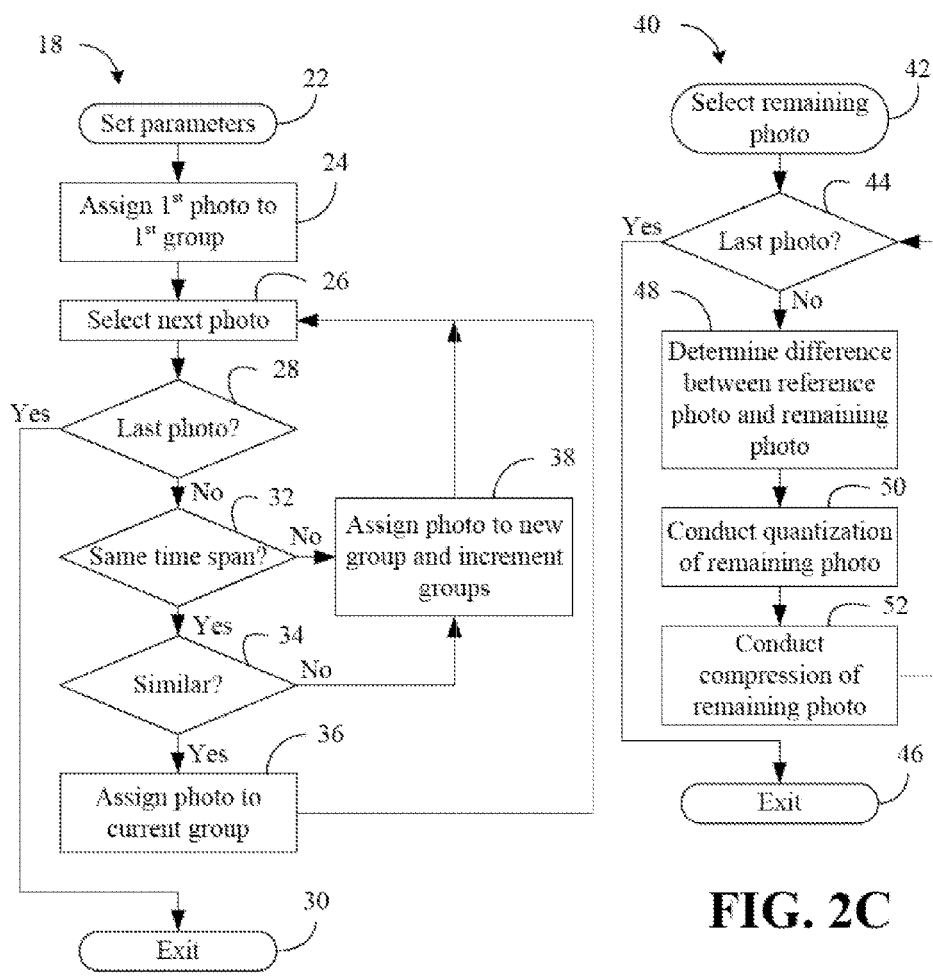
FIG. 2B
FIG. 2C

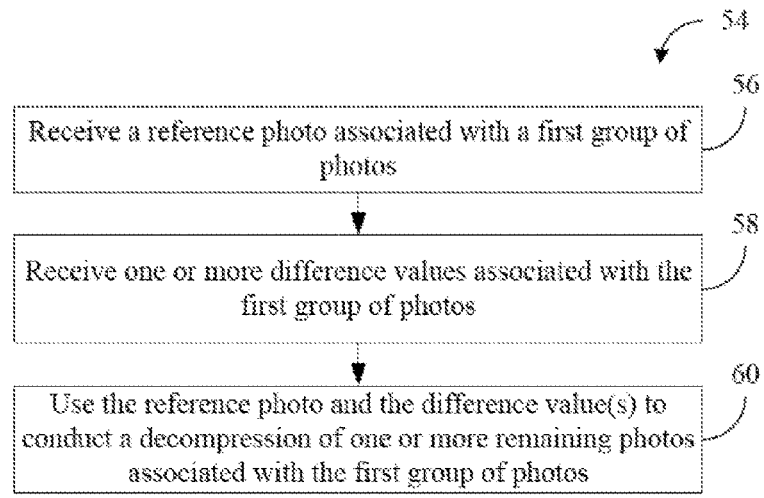
FIG. 3A
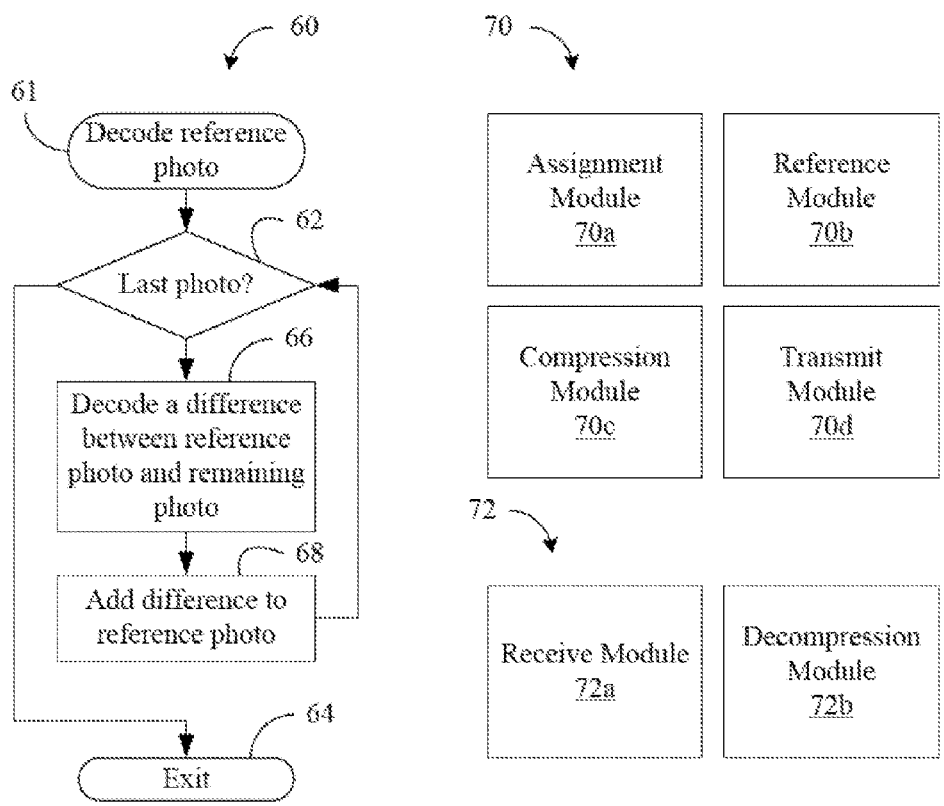
FIG. 3B
FIG. 4

GROUPING AND COMPRESSING SIMILAR PHOTOS

TECHNICAL FIELD

Embodiments generally relate to the management of photos. More particularly, embodiments relate to the grouping and compression of similar photos.

BACKGROUND

Mobile devices such as smart phones and tablets may be equipped with one or more cameras that enable users of the mobile devices to capture images of their surroundings. Indeed, an increasing popularity of social networking and other applications may lead to a relatively large number of images being captured by a given mobile device. Moreover, it may be common for many of the photos to be similar to one another, particularly if they are taken over a relatively short period of time. Storing these similar photos locally on the mobile device may consume valuable memory and/or processing resources. Additionally, storing similar photos remotely (e.g., via cloud synchronization) may also consume bandwidth and/or networking resources, which may be limited in high volume cloud computing infrastructures.

BRIEF DESCRIPTION OF THE DRAWINGS

The various advantages of the embodiments will become apparent to one skilled in the art by reading the following specification and appended claims, and by referencing the following drawings, in which:

FIGS. 2A-2C are flowcharts of examples of methods of encoding photos according to embodiments;

FIGS. 3A and 3B are flowcharts of examples of methods of decoding photos according to embodiments;

FIG. 4 is a block diagram of an example of a logic architecture according to an embodiment;

DESCRIPTION OF EMBODIMENTS

Figure 1:
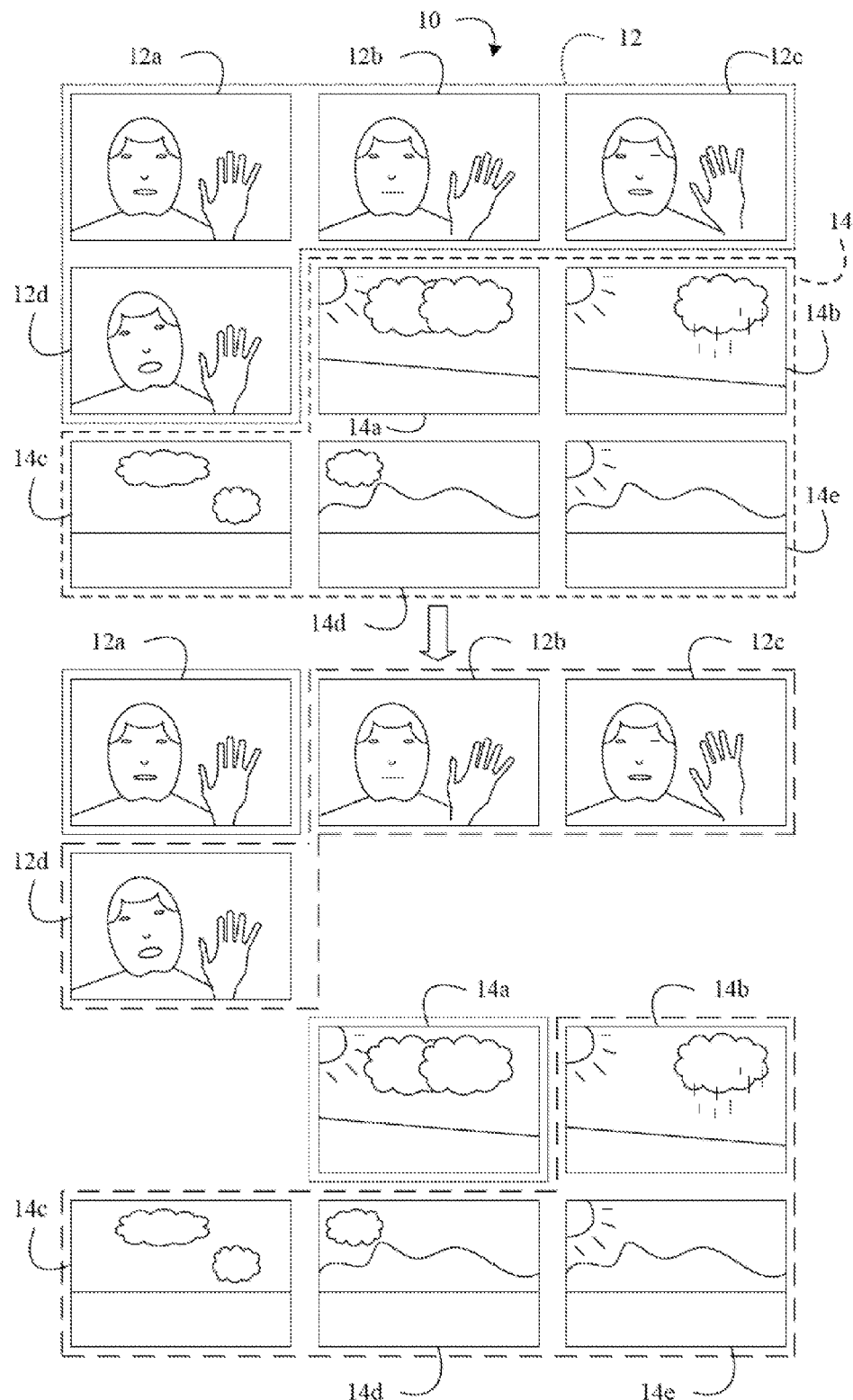
FIG. 1 is an illustration of an example of a plurality of photos according to an embodiment.

Turning now to FIG. 1, a plurality of photos 10 are shown, wherein the photos may be captured by a mobile device such as, for example, a smart phone, smart tablet, mobile Internet device (MID), notebook computer, personal digital assistant (PDA), imaging device, and so forth. The photos 10 may also be captured by a fixed device such as, for example, a server, desktop computer, workstation, and so forth. In the illustrated example, a first subset 12 (12a-12d) of the plurality of photos 10 is identified as containing photos that are similar to one another. Additionally, a second subset 14 (14a-14e) of the plurality of photos 10 may be identified as containing photos that are similar to one another. As will be discussed in greater detail, the first subset 12 may be automatically assigned to a first group and the second subset 14 may be automatically assigned to a second group, wherein a reference photo may be designated in each group for compressing the remaining photos in the respective group. Such an approach may reduce the load on local memory resources as well as the load on networking resources associated with transmission of the photos 10 to a remote server (e.g., via cloud synchronization).

The photos 10 may generally be time stamped or otherwise annotated to indicate when they were captured. In the illustrated example, a photo 12a having an earliest time stamp (e.g., chronologically/temporally first photo) among the first subset 12 is selected as the reference photo for the group corresponding to the first subset 12 of the photos 10, and a photo 14a having an earliest time stamp among the second subset 14 is selected as the reference photo for the group corresponding to the second subset 14 of the photos 10. Selecting the photo with the earliest time stamp may significantly reduce complexity, which may be particularly advantageous on mobile devices having relatively tight processing, power and/or battery life constraints. The photo 12a may be used to conduct a compression of the remaining photos 12b-12d assigned to the first group, and the photo 14a may be used to conduct a compression of the remaining photos 14b-14e assigned to the second group.

Turning now to FIGS. 2A-2C, a method 16 of encoding photos is shown. The method 16 may be implemented as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof. For example, computer program code to carry out operations shown in method 16 may be written in any combination of one or more programming languages, including an object oriented programming language such as Java, Smalltalk, C++ or the like and conventional procedural programming languages, such as the "C" programming language or similar programming languages.

Illustrated processing block 18 provides for assigning a first subset of a plurality of photos to a first group. With specific reference to FIG. 2B, one approach to assigning photos to groups is shown in greater detail. In particular, one or more parameters such as, for example, time span and/or similarity parameters, may be set at block 22. A time span parameter might be set to, for example, ten minutes in order to establish the image capture period of time over which photos will be assigned to the same group. Additionally, a similarity parameter might be set to a value such as, for example, thirty percent in order to establish the amount of commonality and/or redundancy that will result in a match between photos (e.g., designating them as "similar"). The values provided herein are to facilitate discussion only, and may vary depending upon the circumstances. Other parameters to facilitate group assignments and/or similarity determinations may also be set at block 22.

A first photo may be assigned to a first group at block 24, wherein the next photo may be selected at block 26. A determination may be made at block 28 as to whether the last photo has been reached. If so, the illustrated process terminates at block 30. Otherwise, a determination may be made at block 32 as to whether the currently selected photo was captured during the same time span as the first photo. As already noted, the time span parameter may have been set previously at block 22. If the selected photo was captured during the same time span as the first photo (e.g., within ten minutes of the first photo), illustrated block 34 determines whether the first photo and the currently selected photo are similar.

A wide variety of approaches may be used to make the determination at block 34. For example, off-the-shelf solutions such as blob detection, mean shift image analysis, camshift image analysis, etc., may provide an indication of the level of similarly between two photos on a pixel-by-pixel basis and/or a block-by-block basis. As already noted, the similarity parameter may effectively provide a threshold (e.g., 30%) for determining that the photos are similar. If the first photo and the currently selected photo are similar, block 36 may assign the currently selected photo to the first group. If either the photos are from different time spans or the photos are not similar, the currently selected photo may be assigned to a new group at block 38. The illustrated process repeats until all photos have been assigned to a group.

Returning to FIG. 2A, a reference photo may be selected from the first group at block 20, wherein selecting the reference photo may involve identifying the photo in the corresponding group that has the earliest time stamp. Additionally, the reference photo may be used to conduct a compression of the remaining photos in the first group at block 40. With specific reference to FIG. 2C, one approach to compressing photos is shown in greater detail. In particular, block 42 may provide for selecting a remaining photo in the corresponding group. Moreover, a determination may be made at block 44 as to whether the last photo in the corresponding group has been reached. If so, the illustrated process terminates at block 46. Otherwise, illustrated block 48 determines the difference between the reference photo and the remaining photo (e.g., $A_i-A_1$, where $A_i$ is the remaining photo and $A_1$ is the reference photo).

An optional quantization of the remaining photo and/or reference photo may be conducted at block 50. The quantization may reduce the number of values used to express the pixels of the photos, although it may also yield a lossy result. A compression of the remaining photo may be conducted at block 52, wherein conducting the compression may involve coding the residual difference value between the reference photo and the remaining photo (e.g., $A_i-A_1$). In one example, Huffman coding may be used to compress the reference photo as well as the remaining photos assigned to the group. In this regard, bypassing block 50 may provide a lossless result. The illustrated process repeats until all remaining photos assigned to the group in question have been compressed. The method 16 (FIG. 2A) may also provide for transmitting the reference photo and the compressed one or more remaining photos to a remote server.

Turning now to FIGS. 3A and 3B, a method 54 of decoding photos is shown. The method 54 may be implemented as a set of logic instructions stored in a machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof. For example, computer program code to carry out operations shown in method 54 may be written in any combination of one or more programming languages, including an object oriented programming language such as Java, Smalltalk, C++ or the like and conventional procedural programming languages, such as the "C" programming language or similar programming languages.

Illustrated processing block 56 provides for decoding a reference photo associated with a first group of photos, wherein one or more difference values associated with the first group of photos may be received at block 58. The reference photo and difference values may be received in the same or different communications. The reference photo and the one or more difference values may be used at block 60 to conduct a decompression of the remaining photos assigned to the first group. With specific reference to FIG. 3B, one approach to conducting the decompression of the remaining photos is shown in greater detail. In particular, block 61 may decode the reference photo and a determination may be made at block 62 as to whether the last remaining photo has been reached. If so, the process may terminate at block 64. Otherwise, illustrated block 66 decodes the difference value (e.g., $A_i-A_1$) between the reference photo and the currently selected remaining photo. Block 68 may add the decoded difference value to the reference photo ($A_1+(A_i-A_1)=A_i$) to obtain the decoded remaining photo. The illustrated approach may therefore provide for lossless recovery of a large number of photos at a remote server, while minimizing the load placed on networking, resources used to communicate the photos between client devices and the server.

FIG. 4 shows a logic architecture having a client portion 70 (70a-70d) and a server portion 72 (72a, 72b). In general, the client portion 70 may be used by a client device (e.g., mobile, fixed) to generate photos and the server portion 72 may be used by a server to synchronize photos with client devices. More particularly, the client portion 70 may generally implement the method 16 (FIG. 2A) and the server portion 72 may generally implement the method 54 (FIG. 3A), already discussed.

In the illustrated example, an assignment module 70a assigns a first subset of a plurality of photos to a first group and a reference module 70b selects a reference photo from the first group. In one example, the assignment module 70a assigns the first subset to the first group based on one or more of a time span metric or an image similarity metric, and the reference module 70b selects the reference photo by identifying the photo in the first subset having the earliest time stamp in the first group. The illustrated client portion 70 also includes a compression module 70c that uses the reference photo to conduct a compression of one or more remaining photos assigned to the first group. As already noted, the compression module 70c may determine a difference between each of the one or more remaining photos and the reference photo to conduct the compression, and may optionally conduct a quantization of the one or more remaining photos. The illustrated client portion 70 also includes a transmit module 70d to transmit the reference photo and the compressed one or more remaining photos assigned to the first group to a remote server.

The server portion 72 of the illustrated architecture includes a receive module 72a to receive a reference photo associated with a first group of photos and one or more difference values associated with the first group of photos. A decompression module 72b may use the reference photo to conduct a decompression of one or more remaining photos associated with the first group. In one example, the decompression module 72b decodes each difference value to determine a difference between each of the one or more remaining photos and the reference photo. In addition, the decompression module may add each difference to the reference photo to conduct the decompression.

Figure 5:
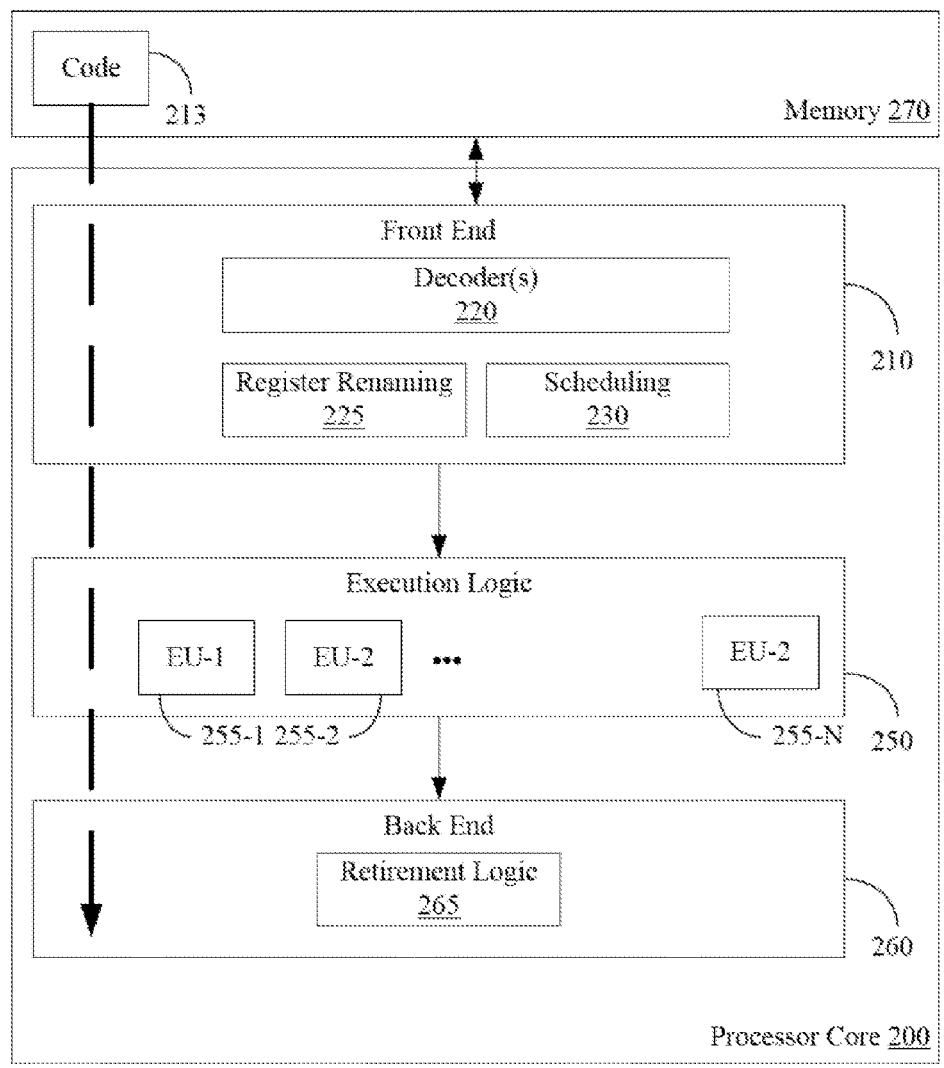
FIG. 5 is a block diagram of an example of a processor according to an embodiment.

FIG. 5 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 5, a processing element may alternatively include more than one of the processor core 200 illustrated in FIG. 5. The processor core 200 may be a single-threaded core or, for at least one embodiment, the processor core 200 may be multithreaded in that it may include more than one hardware thread context (or "logical processor") per core.

FIG. 5 also illustrates a memory 270 coupled to the processor 200. The memory 270 may be any of a wide variety of memories (including various layers of memory hierarchy) as are known or otherwise available to those of skill in the art. The memory 270 may include one or more code 213 instruction(s) to be executed by the processor 200 core, wherein the code 213 may implement the client portion 70 (FIG. 4) or the server portion 72 (FIG. 4) of the aforementioned logic architecture. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end 210 also includes register renaming logic 225 and scheduling logic 230, which generally allocate resources and queue the operation corresponding to the convert instruction for execution.

The processor 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 5, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 6:
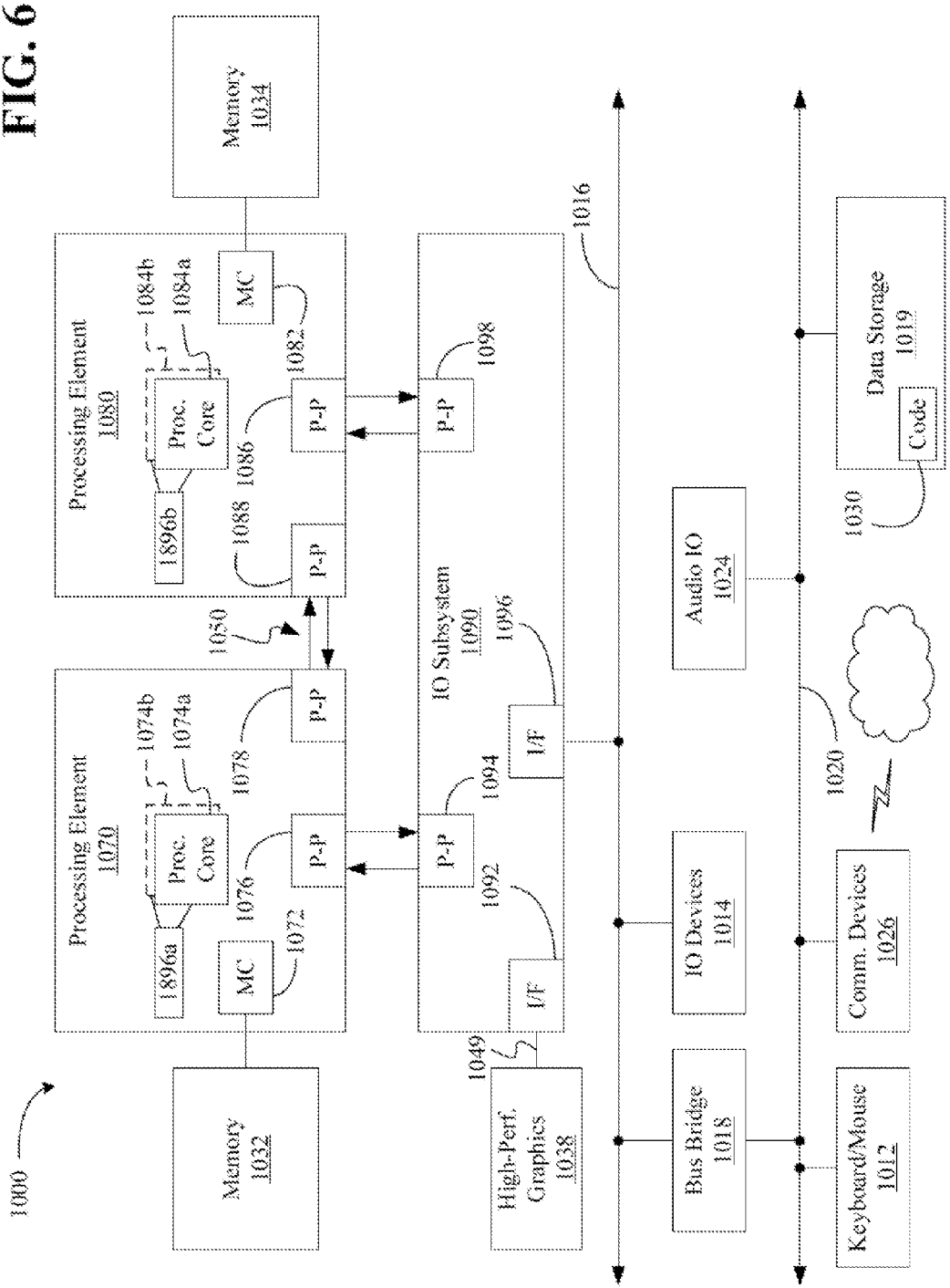
FIG. 6 is a block diagram of an example of a system according to an embodiment.

Referring now to FIG. 6, shown is a block diagram of a system 1000 embodiment in accordance with an embodiment. Shown in FIG. 6 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 6 may be implemented as a multi-drop bus rather than point-to-point interconnect.

As shown in FIG. 6, each of processing elements 1070 and 1080 may be multicore processors, including first and second processor cores (i.e., processor cores 1074*a* and 1074*b* and processor cores 1084*a* and 1084*b*). Such cores 1074, 1074*b*, 1084*a*, 1084*b* may be configured to execute instruction code in a manner similar to that discussed above in connection with FIG. 5.

Each processing element 1070, 1080 may include at least one shared cache 1896*a*, 1896*b*. The shared cache 1896*a*, 1896*b* may store data (e.g., instructions) that are utilized by one or more components of the processor, such as the cores 1074*a*, 1074*b* and 1084*a*, 1084*b*, respectively. For example, the shared cache 1896*a*, 1896*b* may locally cache data stored in a memory 1032, 1034 for faster access by components of the processor. In one or more embodiments, the shared cache 1896*a*, 1896*b* may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 6, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 6, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 6, various I/O devices 1014 (e.g., cameras) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, network controllers/communication device(s) 1026 (which may in turn be in communication with a computer network), and a data storage unit 1019 such as a disk drive or other mass storage device which may include code 1030, in one embodiment. The code 1030 may include instructions for performing embodiments of one or more of the methods described above. Thus, the illustrated code 1030 may implement the client portion 70 (FIG. 4) or server portion 72 (FIG. 4) of the aforementioned logic architecture, and may be similar to the code 213 (FIG. 5), already discussed. Further, an audio I/O 1024 may be coupled to second bus 1020.

Note that other embodiments are contemplated. For example, instead of the point-to-point architecture of FIG. 6, a system may implement a multi-drop bus or another such communication topology. Also, the elements of FIG. 6 may alternatively be partitioned using more or fewer integrated chips than shown in FIG. 6.

ADDITIONAL NOTES AND EXAMPLES

Example 1 may include an apparatus to encode photos, comprising an assignment module to assign a first subset of a plurality of photos to a first group, a reference module to select a reference photo from the first group and a compression module to use the reference photo to conduct a compression of one or more remaining photos assigned to the first group.

Example 2 may include the apparatus of Example 1, further including a transmit module to transmit the reference photo and the compressed one or more remaining photos assigned to the first group to a remote server.

Example 3 may include the apparatus of Example 1, wherein the compression module is to determine a difference between each of the one or more remaining photos and the reference photo to conduct the compression.

Example 4 may include the apparatus of Example 1, wherein the assignment module is to assign the first subset of the plurality of photos to the first group based on one or more of a time span metric or an image similarity metric.

Example 5 may include the apparatus of Example 1, wherein the reference module is to identify a photo in the first subset having an earliest time stamp in the first group to select the reference photo.

Example 6 may include the apparatus of any one of Examples 1 to 5, wherein the assignment module is to assign a second subset of the plurality of photos to a second group.

Example 7 may include the apparatus of any one of Examples 1 to 5, wherein the compression module is to conduct a quantization of the one or more remaining photos.

Example 8 may include a method of encoding photos, comprising assigning a first subset of a plurality of photos to a first group, selecting a reference photo from the first group and using the reference photo to conduct a compression of one or more remaining photos assigned to the first group.

Example 9 may include the method of Example 8, further including transmitting the reference photo and the compressed one or more remaining photos assigned to the first group to a remote server.

Example 10 may include the method of Example 8, wherein using the reference photo to conduct the compression includes determining a difference between each of the one or more remaining photos and the reference photo.

Example 11 may include the method of Example 8, wherein the first subset of the plurality of photos is assigned to the first group based on one or more of a time span metric or an image similarity metric.

Example 12 may include the method of Example 8, wherein selecting the reference photo includes identifying a photo in the first subset having an earliest time stamp in the first group.

Example 13 may include the method of any one of Examples 8 to 12, further including assigning a second subset of the plurality of photos to a second group.

Example 14 may include the method of any one of Examples 8 to 12, further including conducting a quantization of the one or more remaining photos.

Example 15 may include at least one computer readable storage medium comprising a set of instructions which, if executed by a computing device, cause the computing device to assign a first subset of a plurality of photos to a first group, select a reference photo from the first group and use the reference photo to conduct a compression of one or more remaining photos assigned to the first group.

Example 16 may include the at least one computer readable storage medium of Example 15, wherein the instructions, if executed, cause a computing device to transmit the reference photo and the compressed one or more remaining photos assigned to the first group to a remote server.

Example 17 may include the at least one computer readable storage medium of Example 15, wherein the instructions, if executed, cause a computing device to determine a difference between each of the one or more remaining photos and the reference photo to conduct the compression.

Example 18 may include the at least one computer readable storage medium of Example 15, wherein the first subset of the plurality of photos is to be assigned to the first group based on one or more of a time span metric or an image similarity metric.

Example 19 may include the at least one computer readable storage medium of Example 15, wherein the instructions, if executed, cause a computing device to identify a photo in the first subset having an earliest time stamp in the first group to select the reference photo.

Example 20 may include the at least one computer readable storage medium of any one of Examples 15 to 19, wherein the instructions, if executed, cause a computing device to assign a second subset of the plurality of photos to a second group.

Example 21 may include the at least one computer readable storage medium of any one of Examples 15 to 19, wherein the instructions, if executed, cause a computing device to conduct a quantization of the one or more remaining photos.

Example 22 may include a method of decoding photos, comprising receiving a reference photo associated with a first group of photos, receiving one or more remaining photos associated with the first group of photos and using the reference photo to conduct a decompression of the one or more remaining photos.

Example 23 may include the at least one computer readable storage medium of Example 22, wherein the instructions, if executed, cause a computing device to decode each difference value to determine a difference between each of the one or more remaining photos and the reference photo.

Example 24 may include the at least one computer readable storage medium of Example 23, wherein the instructions, if executed, cause a computing device to add each difference to the reference photo to conduct the decompression.

Example 25 may include a method of decoding photos, comprising receiving a reference photo associated with a first group of photos, receiving one or more difference values associated with the first group of photos, and using the reference photo and the one or more difference values to conduct a decompression of one or more remaining photos associated with the first group of photos.

Example 26 may include the method of Example 25, further including decoding each difference value to determine a difference between each of the one or more remaining photos and the reference photo.

Example 27 may include the method of Example 26, further including adding each difference to the reference photo to conduct the decompression.

Example 28 an apparatus to decode photos, comprising a receive module to receive a reference photo associated with a first group of photos and one or more difference values associated with the first group of photos, and a decompression module to use the reference photo and the one or more difference values to conduct a decompression of one or more remaining photos associated with the first group of photos.

Example 29 may include the apparatus of Example 28, wherein the decompression module is to decode each difference value to determine a difference between each of the one or more remaining photos and the reference photo.

Example 30 may include the apparatus of Example 29, wherein the decompression module is to add each difference to the reference photo to conduct the decompression.

Thus, techniques described herein may reduce the load placed on memory and/or processing resources of client devices that capture a relatively large number of photos. For example, automatically designating the earliest photo in a group as the reference photo for that group may reduce complexity and processing overhead. Moreover, the load placed on bandwidth and other networking resources may also be reduced via the compression techniques described herein.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

I claim:

1. An apparatus to encode photos, comprising a processor to implement:
    an assignment logic to assign a first subset of a plurality of photos to a first group;
    a reference logic to select a reference photo from the first group;
    a compression logic to use the reference photo to conduct a compression of one or more remaining photos assigned to the first group; and
    a transmit logic to transmit the reference photo and the compressed one or more remaining photos assigned to the first group to a remote server.

2. The apparatus of claim 1, wherein the compression logic is to determine a difference between each of the one or more remaining photos and the reference photo to conduct the compression.

3. The apparatus of claim 1, wherein the assignment logic is to assign the first subset of the plurality of photos to the first group based on one or more of a time span metric or an image similarity metric.

4. The apparatus of claim 1, wherein the reference logic is to identify a photo in the first subset having an earliest time stamp in the first group to select the reference photo.

5. The apparatus of claim 1, wherein the assignment logic is to assign a second subset of the plurality of photos to a second group.

6. The apparatus of claim 1, wherein the compression logic is to conduct a quantization of the one or more remaining photos.

7. A method of encoding photos, comprising a processor to implement:
    assigning a first subset of a plurality of photos to a first group;
    selecting a reference photo from the first group;

using the reference photo to conduct a compression of one or more remaining photos assigned to the first group; and transmitting the reference photo and the compressed one or more remaining photos assigned to the first group to a remote server.

8. The method of claim 7, wherein using the reference photo to conduct the compression includes determining a difference between each of the one or more remaining photos and the reference photo.

9. The method of claim 7, wherein the first subset of the plurality of photos is assigned to the first group based on one or more of a time span metric or an image similarity metric.

10. The method of claim 7, wherein selecting the reference photo includes identifying a photo in the first subset having an earliest time stamp in the first group.

11. The method of claim 7, further including assigning a second subset of the plurality of photos to a second group.

12. The method of claim 7, further including conducting a quantization of the one or more remaining photos.

13. At least one non-transitory computer readable storage medium comprising a set of instructions which, if executed by a computing device, cause the computing device to:
assign a first subset of a plurality of photos to a first group;
select a reference photo from the first group;
use the reference photo to conduct a compression of one or more remaining photos assigned to the first group; and
transmit the reference photo and the compressed one or more remaining photos assigned to the first group to a remote server.

14. The at least one computer readable storage medium of claim 13, wherein the instructions, if executed, cause a computing device to determine a difference between each of the one or more remaining photos and the reference photo to conduct the compression.

15. The at least one computer readable storage medium of claim 13, wherein the first subset of the plurality of photos is to be assigned to the first group based on one or more of a time span metric or an image similarity metric.

16. The at least one computer readable storage medium of claim 13, wherein the instructions, if executed, cause a computing device to identify a photo in the first subset having an earliest time stamp in the first group to select the reference photo.

17. The at least one computer readable storage medium of claim 13, wherein the instructions, if executed, cause a computing device to assign a second subset of the plurality of photos to a second group.

18. The at least one computer readable storage medium of claim 13, wherein the instructions, if executed, cause a computing device to conduct a quantization of the one or more remaining photos.

19. At least one non-transitory computer readable storage medium comprising a set of instructions which, if executed by a computing device, cause the computing device to:
receive a reference photo associated with a first group of photos;
receive one or more difference values associated with the first group of photos; and
use the reference photo and the one or more difference values to conduct a decompression of one or more remaining photos associated with the first group of photos, wherein each difference value is to be decoded to determine a difference between each of the one or more remaining photos and the reference photo.

20. The at least one computer readable storage medium of claim 19, wherein the instructions, if executed, cause a computing device to add each difference to the reference photo to conduct the decompression.

* * * * *